United States Patent
Hotelling et al.

(10) Patent No.: US 9,316,535 B2
(45) Date of Patent: Apr. 19, 2016

(54) REMOTE CONTROL SYSTEMS THAT CAN DISTINGUISH STRAY LIGHT SOURCES

(71) Applicant: Apple Inc., Cupertino, CA (US)

(72) Inventors: Steven Porter Hotelling, San Jose, CA (US); Nicholas Vincent King, San Jose, CA (US); Duncan Robert Kerr, San Francisco, CA (US); Wing Kong Low, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 235 days.

(21) Appl. No.: 14/188,160

(22) Filed: Feb. 24, 2014

(65) Prior Publication Data

US 2014/0166911 A1    Jun. 19, 2014

Related U.S. Application Data

(60) Continuation of application No. 12/637,246, filed on Dec. 14, 2009, now Pat. No. 8,658,995, which is a continuation of application No. 12/174,542, filed on Jul. 16, 2008, now Pat. No. 7,655,937, which is a division of application No. 11/594,313, filed on Nov. 7, 2006, now Pat. No. 7,566,858.

(51) Int. Cl.
| | |
|---|---|
| *G01J 1/44* | (2006.01) |
| *G08C 23/04* | (2006.01) |
| *H04N 5/44* | (2011.01) |
| *H04N 21/422* | (2011.01) |

(52) U.S. Cl.
CPC . *G01J 1/44* (2013.01); *G08C 23/04* (2013.01); *H04N 5/4403* (2013.01); *H04N 21/42221* (2013.01); *G08C 2201/32* (2013.01); *H04N 2005/4426* (2013.01)

(58) Field of Classification Search
CPC ............... H04N 21/42221; H04N 2005/4426; G08C 2201/32; G08C 23/04; G01J 1/44
USPC .................... 250/578.1; 340/825.72, 825.57; 345/158, 169, 163
See application file for complete search history.

(56) References Cited

U.S. PATENT DOCUMENTS

| | | |
|---|---|---|
| 4,229,009 A | 10/1980 | Ohta |
| 4,395,045 A | 7/1983 | Baer |
| 4,813,682 A | 3/1989 | Okada |
| 5,115,230 A | 5/1992 | Smoot |
| 5,286,967 A | 2/1994 | Bates |
| 5,502,459 A | 3/1996 | Marshall et al. |
| 5,504,501 A | 4/1996 | Hauck et al. |

(Continued)

OTHER PUBLICATIONS

R. Sukthankar, et al., "Smarter Presentations: Exploiting homography in camera-projector systems," Proceedings of International Conference on Computer Vision, 2001.

(Continued)

*Primary Examiner* — Seung C Sohn
(74) *Attorney, Agent, or Firm* — Van Court & Aldridge LLP

(57) ABSTRACT

Remote control systems that can distinguish predetermined light sources from stray light sources, e.g., environmental light sources and/or reflections are provided. The predetermined light sources can be disposed in asymmetric substantially linear or two-dimensional patterns. The predetermined light sources also can output waveforms modulated in accordance with one or more signature modulation characteristics. The predetermined light sources also can output light at different signature wavelengths.

27 Claims, 7 Drawing Sheets

(56) References Cited

U.S. PATENT DOCUMENTS

| | | | |
|---|---|---|---|
| 5,515,079 | A | 5/1996 | Hauck et al. |
| 5,574,479 | A | 11/1996 | Odell |
| 5,736,975 | A | 4/1998 | Lunetta |
| 5,786,804 | A | 7/1998 | Gordon |
| 5,796,387 | A | 8/1998 | Curran et al. |
| 5,892,501 | A | 4/1999 | Kim et al. |
| 5,926,168 | A | 7/1999 | Fan |
| 6,130,662 | A | 10/2000 | Umeda |
| 6,146,278 | A | 11/2000 | Kobayashi |
| 6,171,190 | B1 | 1/2001 | Thanasack et al. |
| 6,175,357 | B1 | 1/2001 | Gordon |
| 6,184,863 | B1 | 2/2001 | Sibert et al. |
| 6,252,720 | B1 | 6/2001 | Haseltine |
| 6,287,198 | B1 | 9/2001 | McCauley |
| 6,331,848 | B1 | 12/2001 | Stove et al. |
| 6,377,242 | B1 | 4/2002 | Sweed |
| 6,618,076 | B1 | 9/2003 | Sukthankar et al. |
| 6,636,199 | B2 | 10/2003 | Kobayashi |
| 6,650,822 | B1 | 11/2003 | Zhou |
| 6,677,929 | B2 * | 1/2004 | Gordon ............ G06F 3/0421 345/156 |
| 6,683,628 | B1 | 1/2004 | Nakagawa et al. |
| 6,727,885 | B1 | 4/2004 | Ishino et al. |
| 6,738,041 | B2 * | 5/2004 | Silber ............ G06F 3/038 345/156 |
| 6,765,555 | B2 | 7/2004 | Wu |
| 7,024,228 | B2 | 4/2006 | Komsi et al. |
| 7,053,932 | B2 | 5/2006 | Lin et al. |
| 7,102,616 | B1 | 9/2006 | Sleator |
| 7,302,181 | B2 | 11/2007 | Ng et al. |
| RE40,410 | E | 7/2008 | Gordon |
| 7,542,072 | B2 | 6/2009 | DeMenthon |
| 7,627,139 | B2 | 12/2009 | Marks et al. |
| 2004/0105264 | A1 | 6/2004 | Spero |
| 2004/0207597 | A1 | 10/2004 | Marks |
| 2006/0152487 | A1 | 7/2006 | Grunnet-Jepsen et al. |
| 2006/0152488 | A1 | 7/2006 | Salsman et al. |
| 2006/0152489 | A1 | 7/2006 | Sweetser et al. |
| 2006/0170874 | A1 | 8/2006 | Yumiki et al. |
| 2006/0277571 | A1 | 12/2006 | Marks et al. |
| 2006/0284841 | A1 | 12/2006 | Hong et al. |
| 2007/0109324 | A1 | 5/2007 | Lin |
| 2008/0012824 | A1 | 1/2008 | Grunnet-Jepsen et al. |
| 2008/0278445 | A1 | 11/2008 | Sweetser et al. |

OTHER PUBLICATIONS

F. Madritsch, "CCD-Camera Based Optical Tracking for Human-Computer Interaction," Proceedings 1st European Conference on Disability, Virtual Reality and Associated Technologies, Maidenhead, pp. 161-170 (1996).

D. R. Olsen, et al., "Laser pointer interactions," Proceedings of the SIGCHI conference on Human factors in computing systems, pp. 17-22 (2001).

B. A. Myers et al., "Interacting at a Distance: Measuring the Performance of Laser Pointers and Other Devices," Proceedings of CHI'2002: Human factors in computing systems, pp. 33-40 (2002).

Agilent ADNK-2623 Optical Mouse Designer's Kit, "Product Overview," Agilent Technologies, pp. 1-4, Jul. 3, 2003.

Agilent ADNS-2620 Optical Mouse Sensor, "Data Sheet," Agilent Technologies, pp. 1-27, May 13, 2005.

Agilent ADNB-6031 and ADNB-6032 Low Power Laser Mouse Bundles, "Data Sheet," Agilent Technologies, pp. 1-44, Apr. 21, 2006.

HiBall-3100 Wide-Area Tracker and 3D Digitizer, 3rdTech, pp. 1 and 2, 2006.

HeadMouse Extreme, Prentke Romich Company, p. 1, Feb. 10, 2008: <http://store.prentrom.com/cgi-bin/store/HE-X.html>.

SpaceMouse Plus, 3D Connexion, pp. 1 and 2, 2006.

RGT Tracking, eReal Games, pp. 1-9, Sep. 26, 2006: <http://www.erealgames.com/aboutrgt.php>.

Wii Remote, pp. 1-4, Sep. 26, 2006: <http://wii.nintendo.com/controllers.html>.

LCD Topgun User Manual, pp. 1-4, Sep. 26, 2006: <http://www.hkems.com/m_main.htm>.

* cited by examiner

REMOTE CONTROL SYSTEMS THAT CAN DISTINGUISH STRAY LIGHT SOURCES

CROSS-REFERENCE TO RELATED APPLICATIONS

This application is a continuation of U.S. patent application Ser. No. 12/637,246 filed Dec. 14, 2009 (now U.S. Pat. No. 8,658,995), which is a continuation of U.S. patent application Ser. No. 12/174,542 filed Jul. 16, 2008 (now U.S. Pat. No. 7,655,937), which is a divisional of U.S. patent application Ser. No. 11/594,313 filed Nov. 7, 2006 (now U.S. Pat. No. 7,566,858). Each of these applications is hereby incorporated herein in its entirety.

FIELD OF THE INVENTION

The present invention can relate to remote control systems that can distinguish predetermined light sources from stray light sources.

BACKGROUND OF THE INVENTION

Some remote control systems use infrared (IR) emitters to determine the position and/or movement of a remote control. For example, if IR emitters are mounted proximate to a television, the remote control may be able to detect its own motion by measuring the motion of the IR emitters with respect to the remote control.

Such systems, however, often experience a common problem in that they may not be able to distinguish desired or predetermined IR light sources from undesirable environmental IR sources, e.g., the sun or a light bulb. Because those systems may mistake environmental IR sources for IR emitters, they may incorrectly determine the position and/or movement of the remote control.

Such systems also may experience another common problem in that the systems may not be able to distinguish IR emitters from reflections of the IR emitters, e.g., from the surface of a table or a window. For example, when IR emitters are disposed in a pattern that is symmetrical about a horizontal axis, the remote control system may mistake reflections of the IR emitters from a table surface for the actual IR emitters. Or, when IR emitters are disposed in a pattern that is symmetrical about a vertical axis, the remote control system may mistake reflections of the IR emitters from a window for the actual IR emitters. Again, such mistakes may result in incorrect determinations of the position and/or movement of the remote control.

SUMMARY OF THE INVENTION

The present invention can include remote control systems that can distinguish predetermined light sources from stray or unintended light sources, such as environmental light sources and/or reflections.

In one embodiment of the present invention, the predetermined light sources can be disposed in asymmetric substantially linear or two-dimensional patterns. Here, a photodetector can detect light output by the predetermined light sources and stray light sources, and transmit data representative of the detected light to one or more controllers. The controllers can identify a derivative pattern of light sources from the detected light indicative of the asymmetric pattern in which the predetermined light sources are disposed.

In another embodiment of the present invention, the predetermined light sources can output waveforms modulated in accordance with signature modulation characteristics. By identifying light sources that exhibit the signature modulation characteristics, a controller of the present invention can distinguish the predetermined light sources from stray light sources that do not modulate their output in accordance with the signature modulation characteristics.

In a further embodiment of the present invention, each predetermined light source can output light at one or more different signature wavelengths. For example, a photodetector module of the present invention can detect the signature wavelengths using multiple photodetectors, each of which can detect one of the signature wavelengths. Alternatively, the photodetector module can include an interleaved photodetector having an array of interleaved pixels. Different portions of the interleaved pixels can detect one of the signature wavelengths.

BRIEF DESCRIPTION OF THE DRAWINGS

The above and other advantages of the present invention will be apparent upon consideration of the following detailed description, taken in conjunction with accompanying drawings, in which like reference characters refer to like parts throughout, and in which.

DETAILED DESCRIPTION OF THE INVENTION

The present invention can include remote control systems that can distinguish predetermined light sources from stray light sources, such as environmental light sources and/or reflections.

Figure 1:
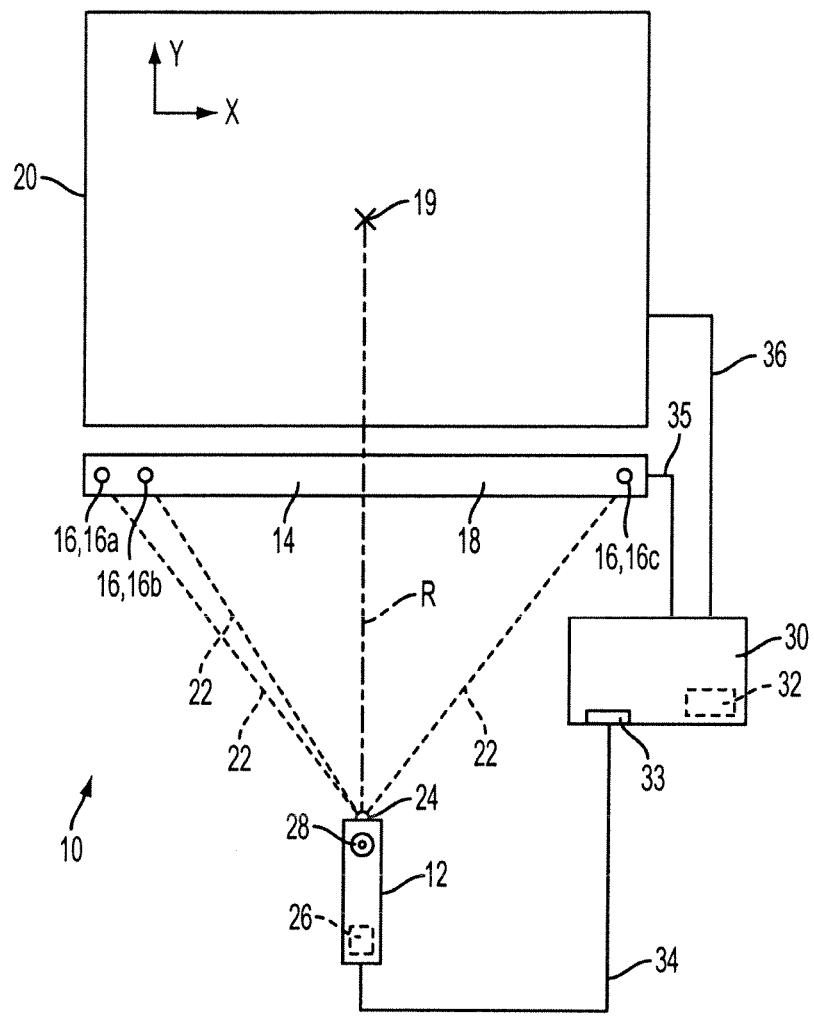
FIG. 1 illustrates one embodiment of a remote control system of the present invention having an asymmetric pattern of predetermined light sources.

FIG. 1 illustrates one embodiment of a remote control system of the present invention. Remote control system 10 can include remote control 12 and multiple predetermined light sources 16. Predetermined light sources 16 can be disposed in frame 18 to form light transmitter 14 or integrated with display 20. As used herein, light sources can either generate light or reflect light shined thereon. If light source(s) act as reflector(s), another light source can project light towards the reflector(s). The reflector(s) can reflect the light back to a photodetector. For example, the photodetector and the other light source can be disposed on remote control 12, whereas the reflector(s) can be disposed proximate to, near, on, or in display 20.

Remote control system 10 can permit a user to interact with an image shown on display 20 by manipulating remote control 12. Display 20 can project an image substantially defined by orthogonal x- and y-axes. Display 20 can include a television having a screen with a nominal curvature, a computer monitor having a screen with a nominal curvature, a flat-screen television, a flat-screen monitor, a surface upon which a projector can project images, or any other type of display known in the art or otherwise.

Remote control system 10 can permit a user to move or otherwise select object 19 (e.g., a cursor) shown on display 20 in the x- and y-axes by pointing remote control 12 at desired locations on or proximate to display 20. Ray R can indicate the location at which remote control 12 is pointing. Remote control system 10 can detect the remote control's motion by measuring the motion of predetermined light sources 16 with respect to its own. Based on the detected motion, remote control system 10 can determine the absolute x- and y-positions of the location to which the remote control is pointing with respect to one or more reference locations, e.g., one or more of the predetermined light sources. Remote control system 10 then can be used to move object 19 to the determined location. Thus, when the user moves remote control 12 in the x- and y-axes, display 20 can show a corresponding movement in object 19 in the x- and y-axes.

Predetermined light sources 16 can emit, e.g., infrared (IR) light 22 to remote control 12. Remote control 12 can detect the emitted light using photodetector 24. Photodetector 24 can include CCD arrays, CMOS arrays, two-dimensional position sensitive photodiode arrays, other types of photodiode arrays, other types of light detection devices known in the art or otherwise, or a combination thereof.

In accordance with the present invention, predetermined light sources 16 can be spatially constrained in an asymmetric substantially linear pattern in frame 18. The substantially linear pattern can be parallel to a longitudinal axis of transmitter 14 and asymmetric about an axis orthogonal to the longitudinal axis of transmitter 14. For example, as shown in FIG. 1, remote control system 10 can include three predetermined light sources 16 disposed in a substantially linear pattern. The distance between left-most predetermined light source 16a and middle predetermined light source 16b can be less than that between middle predetermined light source 16b and right-most predetermined light source 16c. While FIG. 1 illustrates three predetermined light sources, remote control system 10 can include four or more predetermined light sources disposed in an asymmetric substantially linear pattern.

Predetermined light sources 16 can be disposed proximate any edge of display 20, e.g., a top, bottom, or vertical edge of display 20 either in frame 18 or integrated with display 20. Predetermined light sources 16 also can be disposed substantially co-planar with the screen of the display. Alternatively, transmitter 14 and/or predetermined light sources 16 can be disposed at another location near, on, or beneath display 20.

Remote control system 10 also can include controller 26, which can be disposed in remote control 12. Controller 26 can accept data representative of light detected by photodetector 24. In a manner described in greater detail below with respect to FIG. 2, controller 26 can distinguish predetermined light sources from stray light sources using the photodetector data. The controllers described herein can include processors, memory, ASICs, circuits and/or other electronic components.

Remote control 12 also can incorporate user input component 28. A user may actuate user input component 28 when the user wants remote control system 10 to perform an action. For example, a user my actuate user input component 28 when the user is moving remote control 12 and wants object 19 to reflect similar motion on display 20. When the user is not actuating user input component 28, remote control system 10 can be configured to take no action.

User input component 28 can be a scrollwheel similar to that incorporated by a portable media player sold under the trademark iPod™ by Apple Computer, Inc. of Cupertino, Calif. The scrollwheel can include one or more buttons and a touchpad or other input device. The touchpad can permit a user to scroll through software menus by running the user's finger around the track of the scrollwheel. User input component 28 also can include, for example, one or more buttons, a touchpad, a touchscreen display, or a combination thereof.

Remote control system 10 also can include optional console 30. Console 30 can have controller 32 that can perform some or all of the processing described for controller 26. For example, remote control 12 can transmit data representing detected IR light 22 to console 30. Controller 32 in console 30 then can identify predetermined light sources 16 from the light sources detected by photodetector 24.

In one embodiment of the present invention, console 30 can communicate with remote control 12 using cable 34 and/or one or more wireless communication protocols known in the art or otherwise. Console 30 also can communicate with transmitter 14 using cable 35 and/or one or more wireless communication protocols known in the art or otherwise. Console 30 also can communicate with display 20 using cable 36 and/or one or more wireless communication protocols known in the art or otherwise. Alternatively, console 30 can be integrated with display 20 as one unit.

Console 30 also can have one or more connectors 33 to which accessories can be coupled. Accessories can include cables 34 and/or 36, game cartridges, portable memory devices (e.g., memory cards, external hard drives, etc.), adapters for interfacing with another electronic device (e.g., computers, camcorders, cameras, media players, etc.), or combinations thereof.

Figure 2:
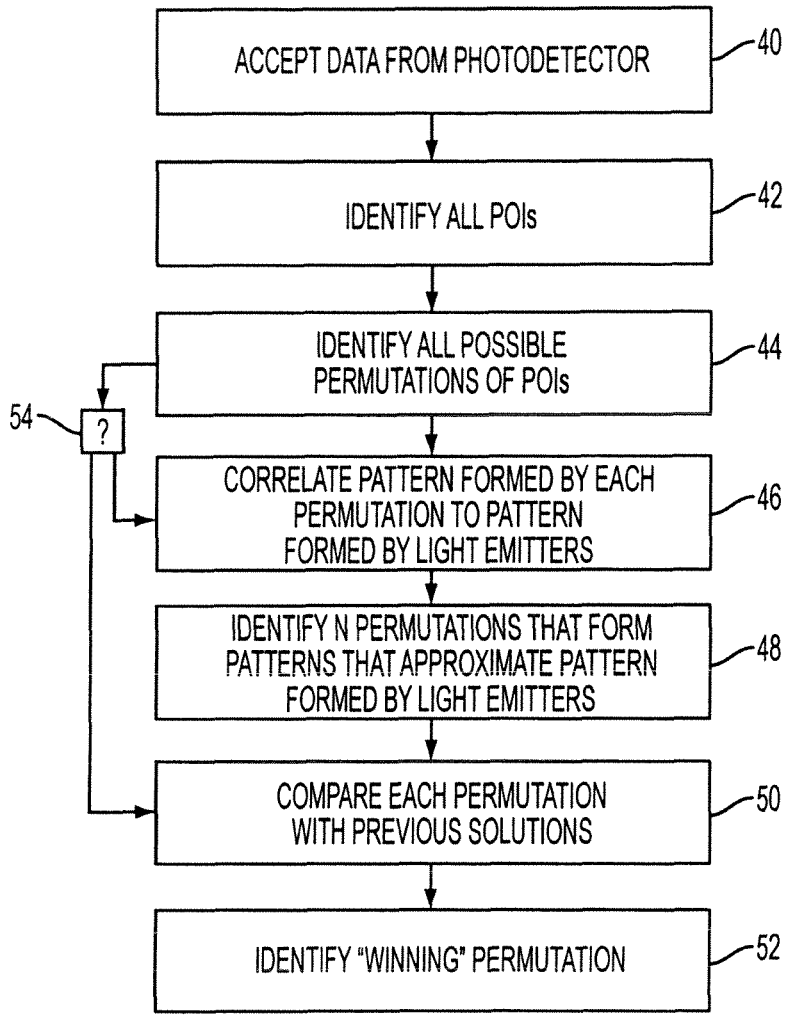
FIG. 2 illustrates a process for distinguishing predetermined light sources from stray light sources based on the pattern in which the light sources are disposed in accordance with one embodiment of the present invention.

FIG. 2 illustrates one embodiment of a process that controller 26 or 32 can employ to distinguish predetermined light sources from stray light sources based on the pattern in which the predetermined light sources are disposed. In step 40, controller 26 or 32 can accept data representative of light detected by photodetector 24. In step 42, controller 26 or 32 can identify a plurality of (e.g., all) points of interest (POIs) or detected light sources from the photodetector data, regardless of whether the light source is one of predetermined light sources 16 or a stray light source. Identification of a POI can include determining positional characteristics of the detected light source. As used herein, the "positional characteristics" of a light source or group of light sources can include characteristics that indicate the absolute or relative position and/or geometry of the light source(s), e.g., the absolute x- and y-positions of the light source(s).

To determine the absolute x- and y-positions of the light sources detected by photodetector 24, controller 26 or 32 can use any available techniques known in the art. For example, U.S. Pat. No. 6,184,863 to Sibert et al., issued on Feb. 6, 2001, and U.S. Pat. No. 7,053,932 to Lin et al, issued on May 30, 2006, the entireties of which are incorporated herein by reference, describe two techniques that can be employed by controller 26 or 32. U.S. Patent Application Publication No. 2004/0207597 to Marks, published on Oct. 21, 2004; No. 2006/0152489 to Sweetser et al., published on Jul. 13, 2006; No. 2006/0152488 to Salsman et al., published on Jul. 13, 2006; and No. 2006/0152487 to Grunnet-Jepsen et al., published on Jul. 13, 2006, the entireties of which also are incorporated herein by reference, describe additional techniques that can be employed by controller 26 or 32. Remote control system 10 also can employ other techniques known in the art or otherwise.

In step 44, controller 26 or 32 can identify a plurality of (e.g., all possible) permutations of the light sources identified in step 42. Each permutation can contain the same number of light sources as the number of predetermined light sources. In the illustrative embodiment of FIG. 1, controller 26 or 32 can identify a plurality of (e.g., all possible) triads, which can be sets of three POIs identified in step 42. In step 46, controller 26 or 32 can correlate the pattern formed by each permutation or triad identified in step 44 to the asymmetric pattern in which predetermined light sources 16 are disposed. Correlation techniques can include statistical techniques, e.g., Chi-square test, least-squares test, or another correlation technique known in the art or otherwise. Controller 26 or 32 can quantify the correlation by determining a correlation coefficient for each permutation or triad. Each correlation coefficient can indicate how well the pattern formed by each permutation matches the pattern formed by the predetermined light sources.

When a user is manipulating remote control 12, the remote control may not be aligned with predetermined light sources 16 in such a way that any of the permutations or triads identified in step 44 will have a pattern that perfectly matches the asymmetric pattern in which predetermined light sources 16 are disposed. Accordingly, in correlating the pattern formed by each permutation or triad identified in step 44 to the asymmetric pattern of predetermined light sources 16, controller 26 or 32 can account for perceived translation, roll, and/or scaling of the asymmetric pattern in the x- and/or y-axes. As used herein, roll of a pattern of predetermined light sources may refer to the rotation of the pattern about an axis orthogonal to the x- and y-axes. Scaling of a pattern of predetermined light sources may refer to the enlargement or reduction of the pattern in the x- and/or y-axes.

In step 48, controller 26 or 32 can identify a predetermined number of N permutations or triads that form patterns that approximate the asymmetric pattern in which predetermined light sources 16 are disposed. Assuming that the correlation coefficients determined in step 46 increase the closer the pattern formed by a permutation correlates to the pattern in which predetermined light sources 16 are disposed, controller 26 or 32 can identify permutations having the best correlation by identifying permutations having the highest correlation coefficients. However, if the correlation coefficients determined in step 46 decrease the closer the pattern formed by a permutation correlates to the pattern in which predetermined light sources 16 are disposed, controller 26 or 32 can identify permutations having the best correlation by identifying permutations having the lowest correlation coefficients.

In step 50, controller 26 or 32 can compare the positional characteristics of each permutation or triad identified in step 48 with "good" values determined in previous solutions. Positional characteristics compared in step 50 may include, e.g., the x-position of each POI, y-position of each POI, perceived translation of the pattern formed by predetermined light sources 16, perceived roll of the pattern formed by predetermined light sources 16, and/or perceived scaling of the pattern formed by predetermined light sources 16. Based on the comparison performed in step 50, controller 26 or 32 can identify the "winning" permutation or triad that most likely corresponds to predetermined light sources 16 in step 52.

In one embodiment of the present invention, controller 26 or 32 can identify in step 48 the permutation having the best correlation (i.e., N=1). In this case, steps 50 and/or 52 may be unnecessary.

As discussed above, remote control 12 may not be aligned with predetermined light sources 16 in such a way that the pattern of the "winning" permutation will perfectly match the asymmetric pattern in which predetermined light sources 16 are disposed. Instead, the pattern of the "winning" permutation may be a derivative indicative of the asymmetric pattern in which predetermined light sources 16 are disposed. For example, the derivative pattern of the "winning" permutation may be translated, rotated, and/or scaled with respect to the asymmetric pattern in which predetermined light sources 16 are disposed.

In one embodiment of the present invention, controller 26 or 32 can continuously reiterate steps 40-52 for each frame of data collected by photodetector 24. However, there may not be a need to distinguish predetermined light sources 16 from stray light sources with each frame of data collected by photodetector 24. In the latter case, controller 26 or 32 can be configured to only perform steps 40-52 for every Jth frame of data collected by photodetector 24, wherein J is a predetermined number. For example, after controller 26 or 32 performs step 44, the controller can be configured to determine whether photodetector 24 has collected J frames of data (step 54). If photodetector 24 has collected J frames of data, controller 26 or 32 then can perform step 46 as described above. However, if photodetector 24 has not collected J frames of data yet, controller 26 or 32 can jump to step 50. That is, controller 26 or 32 can compare positional characteristics of each permutation or triad identified in step 44 with "good" values determined in previous solutions. Based on the comparison performed in step 50, controller 26 or 32 can identify the "winning" permutation that most likely corresponds to predetermined light sources 16 in step 52.

Figure 3A:
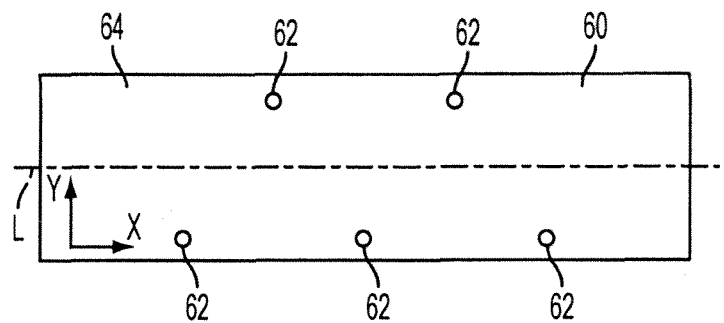
FIGS. 3A-3E illustrate additional embodiments of asymmetric patterns of predetermined light sources in accordance with the present invention.
Figure 3B:
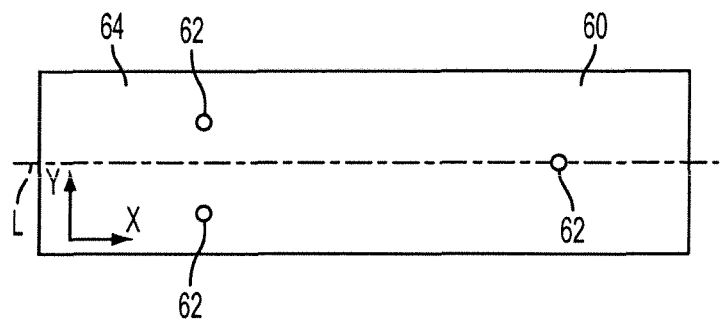
Figure 3C:
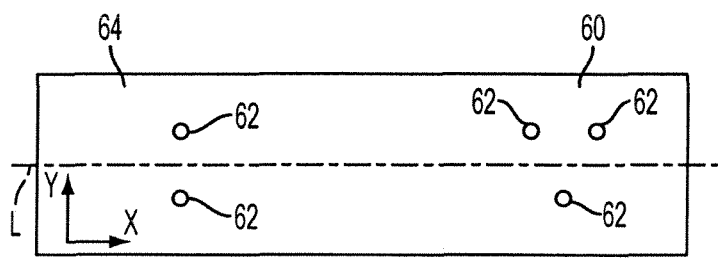

FIGS. 3A-3C illustrate alternative asymmetric patterns in which to dispose predetermined light sources in accordance with the present invention. Similar to the embodiment of FIG. 1, predetermined light sources 62 of FIGS. 3A-3C also can be disposed in frame 64 to form transmitter 60 or integrated with display 20. In the embodiments of FIGS. 3A-3C, however, predetermined light sources 62 can be spatially constrained in a two-dimensional pattern that is asymmetric about longitudinal axis L and/or an axis orthogonal thereto.

For example, as shown in FIG. 3A, predetermined light sources 62 can be disposed in a two-dimensional pattern that is asymmetric about longitudinal axis L. This configuration may be useful to assist remote control system 10 in distinguishing predetermined light sources 62 from reflections of the predetermined light sources from a surface disposed parallel to longitudinal axis L, e.g., a table surface.

As shown in FIG. 3B, predetermined light sources 62 can be disposed in a two-dimensional pattern that is asymmetric about an axis orthogonal to longitudinal axis L. This configuration may be useful to assist remote control system 10 in distinguishing predetermined light sources 62 from reflections of the predetermined light sources from a surface disposed parallel to an axis orthogonal to longitudinal axis L, e.g., a window.

As shown in FIG. 3C, predetermined light sources 62 can be disposed in a two-dimensional pattern that is asymmetric about both longitudinal axis L and an axis orthogonal thereto.

Figure 3D:
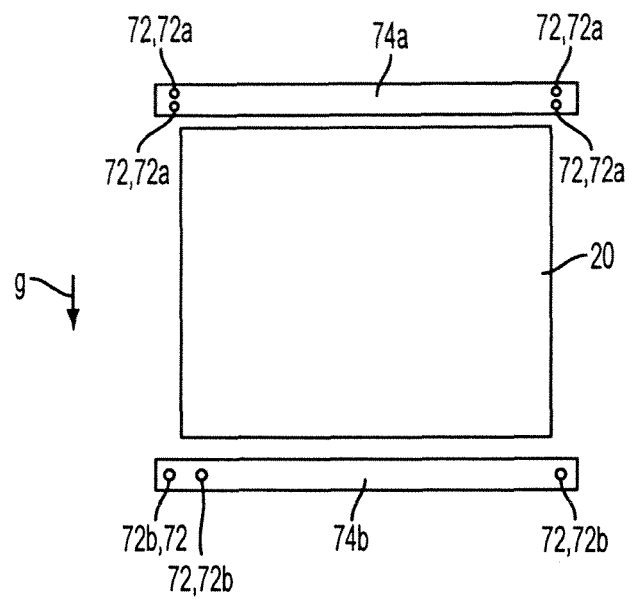
Figure 3E:
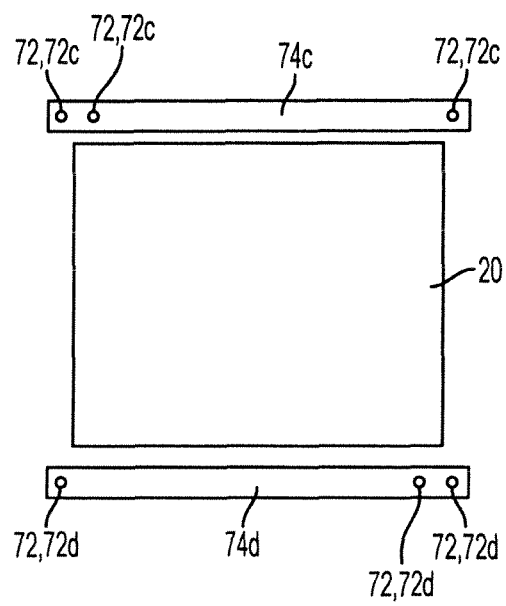

FIGS. 3D-3E illustrate alternative asymmetric patterns in which predetermined light sources can be spatially constrained in accordance with the present invention. Predetermined light sources 72 can be disposed on frames 74a-74d, which in turn can be disposed proximate to the edges of display 20, e.g., top, bottom, and/or vertical edges. Alternatively, predetermined light sources 72 can be integrated into display 20 proximate to the edges of display 20. Advantageously, when predetermined light sources are disposed proximate to top and bottom edges of display 20, remote control system 10 can detect a greater range of vertical motion.

When disposed proximate to display, predetermined light sources 72 can form a two-dimensional pattern that can be asymmetric about an axis parallel and/or orthogonal to the direction of gravity. This is not to say that each group of predetermined light sources 72 disposed proximate to each edge of display 20 needs to form a two-dimensional pattern and/or be asymmetric about an axis parallel and/or orthogonal to the direction of gravity. For example, in FIG. 3D, predetermined light sources 72a can form a symmetric two-dimensional pattern and predetermined light sources 72b can form an asymmetric one-dimensional pattern. In FIG. 3E, predetermined light sources 72c and predetermined light sources 72d each can form an asymmetric substantially linear pattern. Indeed, the pattern formed by predetermined light sources 72d can be the same pattern formed by predetermined light sources 72c, but rotated 180 degrees. Advantageously, each of the illustrative patterns formed by the predetermined light sources in FIGS. 3D and 3E may be useful in assisting remote control system 10 to distinguish the predetermined light sources from reflections of the predetermined light sources from surfaces disposed both parallel and orthogonal to the direction of gravity.

Asymmetric arrangements of predetermined light sources, whether in substantially linear or two-dimensional patterns, also can permit remote control system 10 to determine whether remote control 12 is upside-down or not. For example, if a remote control system employs a symmetrical pattern of IR emitters, the controller may not be able to distinguish whether a user is holding the remote control with, e.g., user input component 28 pointing in the positive y-direction or in the negative y-direction. By disposing predetermined light sources 16 in an asymmetric pattern, a controller of the present invention can distinguish between these configurations by comparing the locations of the detected predetermined light sources relative to each other.

In accordance with another aspect of the present invention, remote control systems can modulate output waveform(s) of one or more predetermined light sources in accordance with one or more predetermined or signature modulation characteristics. For example, genres of signature modulation characteristics can include, e.g., frequency, duty cycle, phase shift, another pulse train signature, or a combination thereof. For example, the remote control system can continuously turn two predetermined light sources ON and OFF at first and second predetermined frequencies or otherwise adjust the signal strengths of the two predetermined light source output waveforms at the predetermined frequencies. The first and second frequencies can have the same value or different values. The remote control system can distinguish predetermined light sources that output modulated waveforms from stray light sources by identifying light sources that exhibit the signature modulation characteristics.

Figure 4:
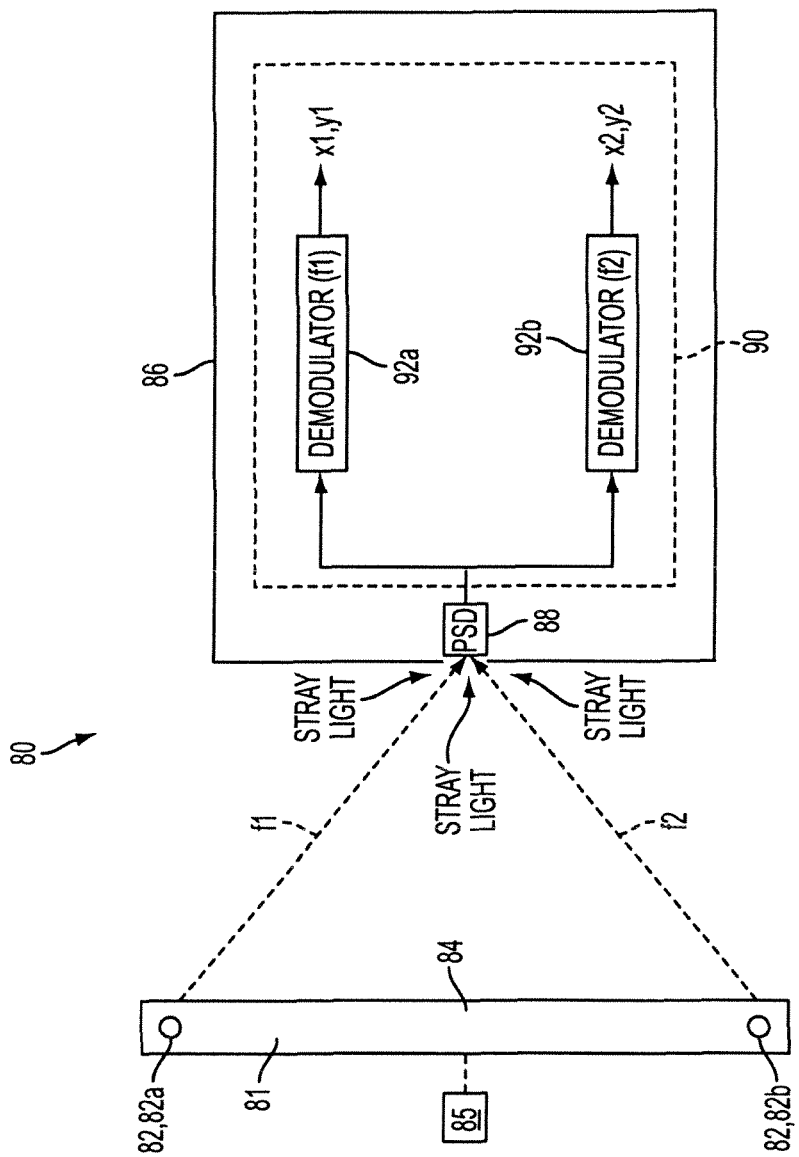
FIG. 4 illustrates a remote control system of one embodiment of the present invention that can distinguish predetermined light sources from stray light sources based on signature modulation characteristics with which output waveforms of the predetermined light sources are modulated.

FIG. 4 illustrates one embodiment of remote control system 80 of the present invention that can distinguish predetermined light sources from stray light sources by identifying light sources that exhibit, e.g., the signature frequencies at which predetermined light source waveforms may be modulated. Transmitter 81 can include first and second predetermined light sources 82a and 82b and one or more frames 84 on which the predetermined light sources are disposed. Modulator(s) 85 can frequency-modulate output of predetermined light sources 82a and 82b so that the predetermined light sources are turned ON and OFF at frequencies f1 and f2 (respectively). Alternatively, modulator(s) 85 can frequency-modulate the output of the predetermined light sources so that the signal strengths of the outputs are otherwise adjusted in a predetermined manner at frequencies f1 and f2. In one embodiment of the present invention, light output from predetermined light sources 82a and 82b can be modulated at predetermined frequencies that may be less likely to be encountered in a user's environment, e.g., between 100 KHz and 300 KHz, inclusive.

Remote control 86 can include photodetector 88 and controller 90. In one embodiment of the present invention, photodetector 88 can be a two-dimensional position sensitive diode (PSD). In the embodiment of FIG. 4, frequencies f1 and f2 can have different values that are greater than the frame rate at which photodetector 88 captures data.

Controller 90 can include first and second frequency demodulators 92a and 92b, each of which can demodulate the photodetector data in accordance with one of the signature frequencies at which predetermined light sources 82a and 82b may be modulated. Demodulator 92a can accept output from photodetector 88 and extract the x- and y-positions of predetermined light source 82a with respect to remote control 86. Likewise, demodulator 92b can accept output from photodetector 88 and extract the x- and y-positions of predetermined light source 82b with respect to remote control 86. In alternative embodiments of the present invention, controller 90 can be disposed in a console, e.g., console 30 of FIG. 1, or within display 20.

While FIG. 4 illustrates transmitter 81 with two predetermined light sources, one of the predetermined light sources can be eliminated or additional predetermined light sources can be added. In the latter case, the predetermined light sources can be disposed in an asymmetric or symmetric pattern. Furthermore, the signature frequency or frequencies at which the predetermined light sources can be modulated can be slower than the frame rate at which a photodetector collects data. In one embodiment of the present invention, one or more predetermined light sources can be modulated at a signature frequency on the order of 10 Hz.

In alternative embodiments of the present invention, modulator(s) 85 can modulate output waveforms of predetermined light sources 82a and 82b in accordance with another genre or combinations of genres of signature modulation characteristic(s). Demodulators 92a and 92b then can be configured to demodulate output data from photodetector 88 with respect to those genres of signature modulation characteristic(s). In further alternative embodiments of the present invention, the demodulators of FIG. 4 may be replaced with correction filters.

Figure 5:
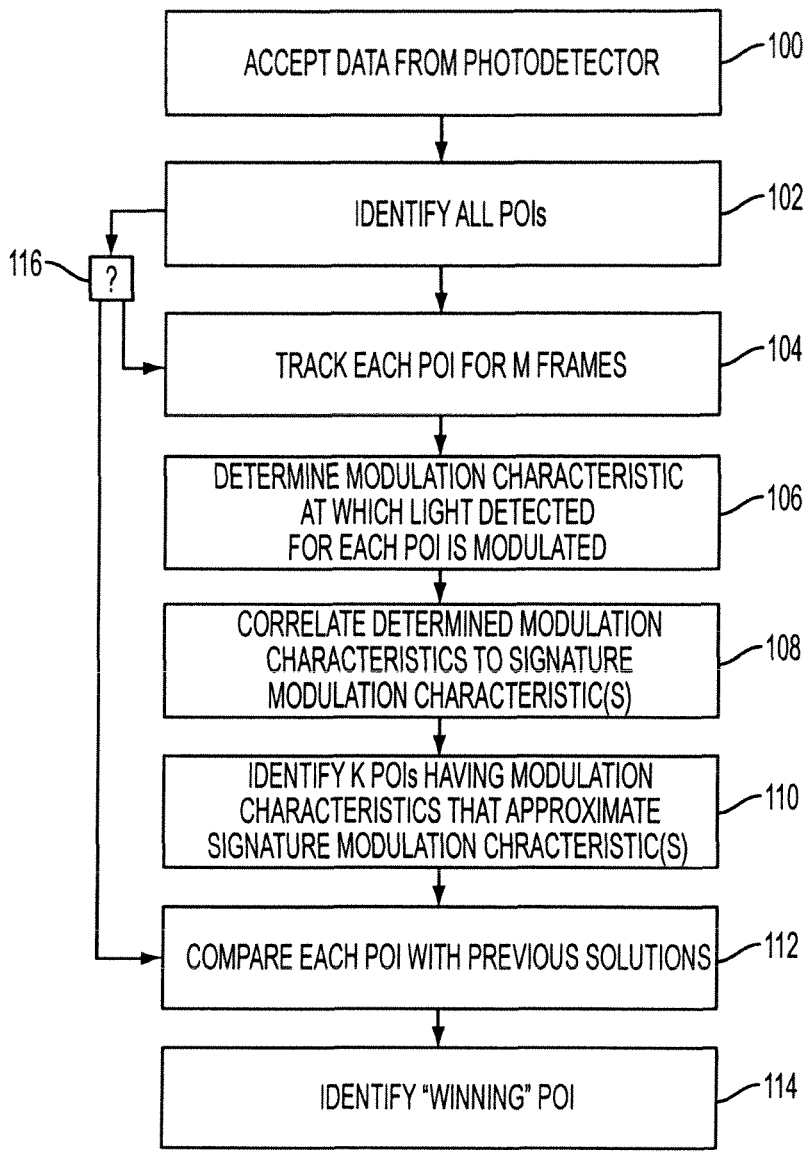
FIG. 5 illustrates a process of one embodiment of the present invention for distinguishing predetermined light sources from stray light sources based on signature modulation characteristics with which output waveforms of the predetermined light sources are modulated.

FIG. 5 illustrates one embodiment of a process that a remote control system of the present invention can employ to distinguish predetermined light sources from stray light sources by identifying light sources that exhibit, e.g., the signature frequencies at which output waveforms of the predetermined light sources are modulated. In step 100, the controller can accept data representative of light detected by a photodetector disposed, e.g., in a remote control. In step 102, the controller can identify a plurality of (e.g., all) points of interest (POIs) or detected light sources from the photodetector data, regardless of whether the light source is one of the predetermined light sources or a stray light source. Identification of a POI may include determining positional characteristics of each detected light source.

In step 104, the controller can track each POI identified in step 102 for a predetermined number of M frames. Thereafter, in step 106, the controller can determine a modulation characteristic, e.g., the frequency, at which the light detected for each POI is modulated over those M frames. For stray light sources that may not modulate or infrequently modulates its light output over the M frames, e.g., the sun, the determined frequency may be very low, e.g., approximately zero.

In step 108, the controller can correlate the modulation characteristics, e.g., the frequencies, determined in step 106 to the signature modulation characteristic(s) at which the predetermined light sources are modulated. The controller can quantify the correlation by determining a correlation coefficient for each POI. The correlation coefficient may indicate how well the modulation characteristic determined for each POI in step 106 matches the signature modulation characteristic(s) at which waveforms output by the predetermined light sources are modulated.

In step 110, the controller can identify a predetermined number K of POIs having modulation characteristics that approximate the signature modulation characteristic(s) at which waveforms output by the predetermined light sources are modulated. Assuming that the correlation coefficients determined in step 110 increase the closer a modulation characteristic determined in step 106 correlates to one of the signature modulation characteristics, the controller can identify POIs having the best correlation by identifying the POIs having the highest correlation coefficients. However, if the correlation coefficients determined in step 108 decrease the closer a modulation characteristic determined in step 106 correlates to one of the signature modulation characteristics, the controller can identify POIs having the best correlation by identifying the POIs having the lowest correlation coefficients.

In step 112, the controller can compare the positional characteristics of each POI identified in step 110 with "good" values determined in previous solutions. Based on the comparison performed in step 112, the controller can identify the "winning" POIs that most likely correspond to the predetermined light sources in step 114.

In one embodiment of the present invention, the controller can continuously reiterate steps 100-114 for each frame of data collected by the photodetector. However, there may not be a need to distinguish the predetermined light sources from stray light sources with each frame of data collected by the photodetector. In the latter case, the controller can be configured to only perform steps 100-114 for every Lth frame of data collected by the photodetector, wherein L is a predetermined number. For example, after the controller performs step 102, the controller can be configured to determine whether the photodetector has collected L frames of data (step 116). If the photodetector has collected L frames of data, the controller then can perform step 104 as described above. However, if the photodetector has not collected L frames of data yet, the controller can jump to step 112. That is, the controller can compare the positional characteristics of each POI identified in step 102 with "good" values determined in previous solutions. Based on the comparison performed in step 112, the controller can identify the "winning" POIs that most likely correspond to predetermined light sources in step 114.

In addition to or instead of modulating the outputs of predetermined light sources at signature frequencies, the remote control system of the present invention also can modulate output waveform(s) of one or more predetermined light sources at signature or predetermined duty cycle(s). Output waveforms can be modulated at different or the same predetermined duty cycle(s). The remote control system also can incorporate one or more phase shifts between waveforms output by multiple predetermined light sources.

In one embodiment of the present invention, a remote control system can have two or more predetermined light sources, the output waveforms of which can be modulated in accordance with different signature modulation characteristics having different predetermined values or genres. Advantageously, this may permit the remote control system to determine whether remote control is upside-down. For example, if a remote control system employs a symmetrical pattern of IR emitters, the controller may not be able to distinguish whether a user is holding the remote control with, e.g., a user input component pointing in the positive y-direction or in the negative y-direction. By modulating the predetermined light source outputs in accordance with different signature modulation characteristics, a controller of the present invention can distinguish between these configurations.

In accordance with another aspect of the present invention, predetermined light sources can output light at different signature wavelengths, e.g., in the IR spectrum. For example, a remote control system of the present invention can include first and second predetermined light sources. The first predetermined light source can emit light at first wavelength $\lambda 1$ and the second predetermined light source can emit light at second wavelength $\lambda 2$. A photodetector module, e.g., disposed in a remote control, can include first and second photodetectors. The first photodetector can be configured to detect light having first wavelength $\lambda 1$ and the second photodetector can be configured to detect light having second wavelength $\lambda 2$. Alternatively, the photodetector module can be an interleaved photodetector. Advantageously, a remote control system having predetermined light sources that output light of different wavelengths can permit the remote control system to determine whether a remote control is upside-down.

Figure 6A:
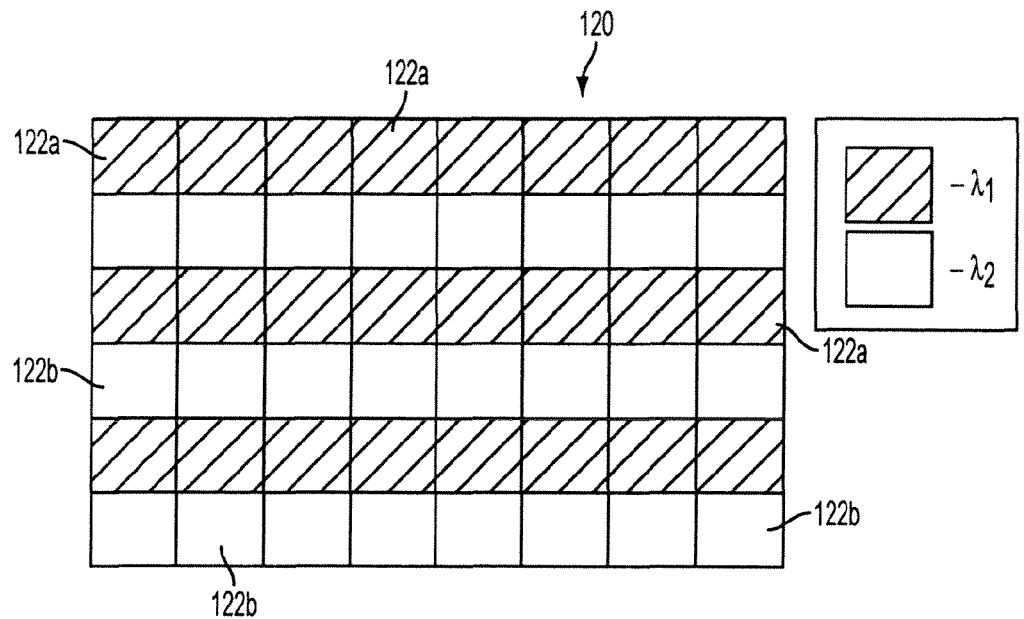
FIGS. 6A-6B illustrate interleaved photodetectors in accordance with one embodiment of the present invention.
Figure 6B:
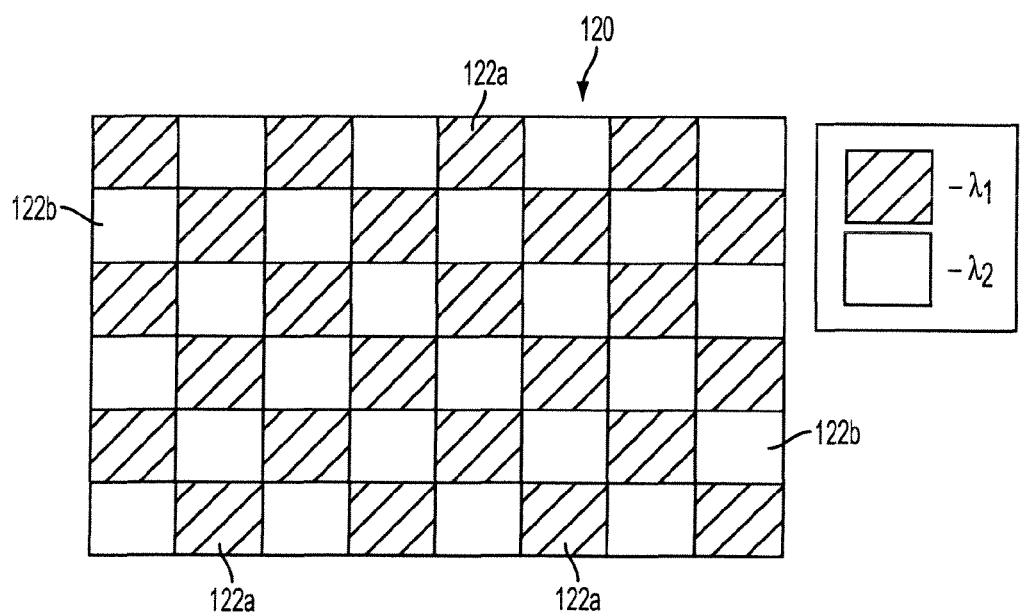

FIGS. 6A-6B illustrate embodiments of interleaved photodetectors in accordance with the present invention. Interleaved photodetector 120 can be a single unit having an array of interleaved pixels 122. Predetermined pixels 122a of the array can be configured to detect light having first wavelength $\lambda 1$ whereas other predetermined pixels 122b of the array can be configured to detect light having second wavelength $\lambda 2$. For example, alternating rows of pixels (see FIG. 6A) or alternating columns of pixels can be configured to detect light having different wavelengths $\lambda 1$ and $\lambda 2$. Alternatively, as shown in FIG. 6B, a checkerboard of pixels can be configured to detect light having different wavelengths $\lambda 1$ and $\lambda 2$. In the embodiments of FIGS. 6A-6B, pixels indicated with hatching may be configured to detect light having first wavelength $\lambda 1$ and pixels indicated without hatching may be configured to detect light having second wavelength $\lambda 2$.

In accordance with another aspect of the present invention, a remote control system of the present invention can combine two or more of the embodiments described above. For example, a remote control system of the present invention can have multiple predetermined light sources disposed in an asymmetric pattern. The output waveform of one of the predetermined light sources can be modulated in accordance with one or more signature modulation characteristics. The remote control system of the present invention can be configured to distinguish the predetermined light sources from stray light sources using a two step process. First, the remote control system can identify a light source that exhibits the signature modulation characteristic. Second, the remote control system can identify a derivative pattern of light sources that include the light source identified in the first step and that is indicative of the asymmetric pattern in which the predetermined light sources are disposed.

Although particular embodiments of the present invention have been described above in detail, it will be understood that this description is merely for purposes of illustration. Alternative embodiments of those described hereinabove also are within the scope of the present invention. For example, predetermined light sources can be disposed in a remote control and a photodetector can be disposed in a display, in a frame disposed proximate to the display, or at any location proximate to, on, or near a display.

A remote control of the present invention can be any electronic device in a system that may need to distinguish predetermined light sources from stray light sources. For example, the remote control can be any portable, mobile, hand-held, or miniature consumer electronic device. Illustrative electronic devices can include, but are not limited to, music players, video players, still image players, game players, other media players, music recorders, video recorders, cameras, other media recorders, radios, medical equipment, calculators, cellular phones, other wireless communication devices, personal digital assistances, programmable remote controls, pagers, laptop computers, printers, or combinations thereof. Miniature electronic devices may have a form factor that is smaller than that of hand-held devices. Illustrative miniature electronic devices can include, but are not limited to, watches, rings, necklaces, belts, accessories for belts, headsets, accessories for shoes, virtual reality devices, other wearable electronics, accessories for sporting equipment, accessories for fitness equipment, key chains, or combinations thereof.

While the above description may have described certain components as being physically separate from other components, one or more of the components can be integrated into one unit. For example, the photodetector or photodetector module can be integrated with one or more controllers.

Also, a controller in the display can perform some or all of the processing described above for controllers 26 and/or 32. Thus, multiple controllers may be used to control remote control systems of the present invention.

Furthermore, while the illustrative remote control systems described above may have included predetermined light sources that output light waves, one or more of the predetermined light sources can be replaced with component(s) that output or reflect other types of energy waves either alone or in conjunction with light waves. For example, the component(s) can output radio waves.

The above described embodiments of the present invention are presented for purposes of illustration and not of limitation, and the present invention is limited only by the claims which follow.

What is claimed is:

1. A method comprising:
   detecting detectable light with a remote control, wherein the detectable light comprises:
      at least a portion of predetermined light, wherein the predetermined light is generated by a plurality of predetermined light sources, wherein the light sources of the plurality of predetermined light sources are disposed in a target pattern, and wherein at least a first predetermined light source of the plurality of predetermined light sources emits a first portion of the predetermined light in accordance with a first signature modulation characteristic; and
      at least a portion of stray light, wherein the stray light is provided by at least one unknown light source; and
   processing the detected detectable light using the first signature modulation characteristic and the target pattern to distinguish the at least a portion of the predetermined light from the at least a portion of the stray light.

2. The method of claim 1, further comprising determining a position of the remote control with respect to the plurality of predetermined light sources based on the processing.

3. The method of claim 1, wherein:
   the target pattern comprises the plurality of predetermined light sources arranged along a first axis;
   the target pattern is asymmetric about a second axis; and
   the second axis is orthogonal to the first axis.

4. The method of claim 3, wherein the second axis intersects the middle of the target pattern.

5. The method of claim 1, wherein the target pattern comprises the plurality of predetermined light sources arranged in a two-dimensional pattern in a plane that comprises a first axis and a second axis that is orthogonal to the first axis.

6. The method of claim 5, wherein:
   the target pattern is asymmetric about the first axis; and
   the first axis intersects the middle of the target pattern.

7. The method of claim 6, wherein:
   the target pattern is asymmetric about the second axis; and
   the second axis intersects the middle of the target pattern.

8. The method of claim 1, wherein the first signature modulation characteristic comprises at least one of:
   a predetermined frequency at which an output wavelength is modulated;
   a predetermined duty cycle at which an output waveform is modulated; and
   a predetermined phase shift.

9. The method of claim 1, wherein:
   a second predetermined light source of the plurality of predetermined light sources emits a second portion of the predetermined light in accordance with a second signature modulation characteristic that is different than the first signature modulation characteristic; and
   the processing the detected detectable light comprises using the first signature modulation characteristic, the second signature modulation characteristic, and the target pattern to distinguish the at least a portion of the predetermined light from the at least a portion of the stray light.

10. The method of claim 1, wherein the processing the detected detectable light comprises:
    identifying a plurality of detected light sources from the detected detectable light;
    identifying a plurality of permutations of the detected light sources, wherein the detected light sources of each permutation form a detected pattern;
    determining a correlation coefficient for each permutation, wherein each correlation coefficient comprises a quantification of a match between a detected pattern and the target pattern; and
    using the correlation coefficients to identify at least one permutation of the plurality of permutations that approximates the target pattern.

11. The method of claim 10, wherein:
    each permutation comprises the particular number of detected light sources; and
    the particular number is the same as the number of light sources of the plurality of predetermined light sources.

12. The method of claim 1, wherein the processing comprises demodulating at least a portion of the detected detectable light in accordance with the first signature modulation characteristic to detect a first detected light source.

13. The method of claim 12, wherein:
    the processing further comprises identifying a derivative pattern of a plurality of detected light sources;

the plurality of detected light sources comprises the first detected light source; and the derivative pattern is indicative of the target pattern.

14. A system comprising:
a module that detects detectable light, wherein the detectable light comprises:
at least a portion of predetermined light, wherein the predetermined light is generated by a plurality of predetermined light sources; and
at least a portion of stray light, wherein the stray light is provided by at least one unknown light source; and
a controller that processes the detected detectable light, using at least one characteristic of the plurality of predetermined light sources that is known to the controller, to distinguish the at least a portion of the predetermined light from the at least a portion of the stray light.

15. The system of claim 14, further comprising the plurality of predetermined light sources, wherein the plurality of predetermined light sources communicates the at least one characteristic to the controller.

16. The system of claim 15, wherein the system comprises a remote control that comprises the controller and the module.

17. The system of claim 15, wherein:
the system comprises a console;
the console comprises the controller; and
the console is wirelessly coupled to at least one of the module and the plurality of predetermined light sources.

18. The system of claim 14, wherein the at least one characteristic of the plurality of predetermined light sources comprises a pattern in which the predetermined light sources of the plurality of predetermined light sources are arranged.

19. The system of claim 18, wherein:
the pattern comprises the plurality of predetermined light sources arranged along a first axis;
the pattern is asymmetric about a second axis;
the second axis is orthogonal to the first axis; and
the second axis intersects the middle of the target pattern.

20. The system of claim 18, wherein:
the pattern comprises the plurality of predetermined light sources arranged in a two-dimensional pattern in a plane that comprises a first axis and a second axis that is orthogonal to the first axis;
the pattern is asymmetric about the first axis; and
the first axis intersects the middle of the pattern.

21. The system of claim 20, wherein:
the pattern is asymmetric about the second axis; and
the second axis intersects the middle of the pattern.

22. The system of claim 14, wherein the at least one characteristic of the plurality of predetermined light sources comprises a signature modulation characteristic with which at least a first predetermined light source of the plurality of predetermined light sources modulates at least a first portion of the predetermined light.

23. The system of claim 22, wherein the signature modulation characteristic comprises at least one of:
a predetermined frequency;
a predetermined duty cycle; and
a predetermined phase shift.

24. The system of claim 14, wherein the controller determines a position of the module with respect to the plurality of predetermined light sources based on the processed detectable light.

25. A method comprising:
detecting detectable light with a remote control, wherein the detectable light comprises:
at least a portion of predetermined light, wherein the predetermined light is generated by a plurality of predetermined light sources; and
at least a portion of stray light, wherein the stray light is provided by at least one unknown light source; and
processing the detected detectable light, using at least one characteristic of the plurality of predetermined light sources that is determined prior to the detecting, to distinguish the at least a portion of the predetermined light from the at least a portion of the stray light.

26. The method of claim 25, further comprising determining a position of the remote control with respect to the plurality of predetermined light sources based on the processing.

27. The method of claim 25, wherein the at least one characteristic comprises at least one of:
a pattern in which the predetermined light sources of the plurality of predetermined light sources are arranged; and
a signature modulation characteristic with which at least a first predetermined light source of the plurality of predetermined light sources modulates at least a first portion of the predetermined light.

* * * * *